United States Patent [19]
Venable et al.

[11] Patent Number: 4,753,121
[45] Date of Patent: Jun. 28, 1988

[54] TILT-TELESCOPE STEERING COLUMN

[75] Inventors: Fredrick D. Venable; David C. Shropshire, both of Lafayette, Ind.

[73] Assignee: TRW Inc., Lyndhurst, Ohio

[21] Appl. No.: 46,141

[22] Filed: May 5, 1987

[51] Int. Cl.$^4$ ............................................. B62D 1/18
[52] U.S. Cl. ...................................... 74/493; 74/521; 74/527; 74/536; 280/775
[58] Field of Search ................ 74/493, 521, 527, 536; 280/775

[56] References Cited

U.S. PATENT DOCUMENTS

| | | | |
|---|---|---|---|
| 3,283,604 | 11/1966 | Meyers | 74/493 |
| 3,386,309 | 6/1968 | Reed et al. | 74/493 |
| 4,527,444 | 7/1985 | McKee et al. | 74/493 |
| 4,649,769 | 3/1987 | Venable | 74/471 R X |

*Primary Examiner*—Allan D. Herrmann
*Attorney, Agent, or Firm*—Tarolli, Sundheim & Covell

[57] ABSTRACT

A steering column having a pair of steering column members arranged coaxially about a first axis. One of the steering column members is axially movable along the first axis relative to the other steering column member. The steering column members are supported for angular movement about a second axis extending transverse to the first axis. A first lock releasably locks the members in one of a plurality of relative axial positions along the first axis. A second lock releasably locks the members in one of a plurality of angular positions about the second axis. A control lever is mounted for pivotal movement toward and away from a neutral position. An actuator operates in response to pivotal movement of the control lever away from the neutral position in a direction of desired movement of the one member to actuate one or both of the first and second locks to release the one member for movement to the desired position in the same direction in which the control lever is moved.

17 Claims, 4 Drawing Sheets

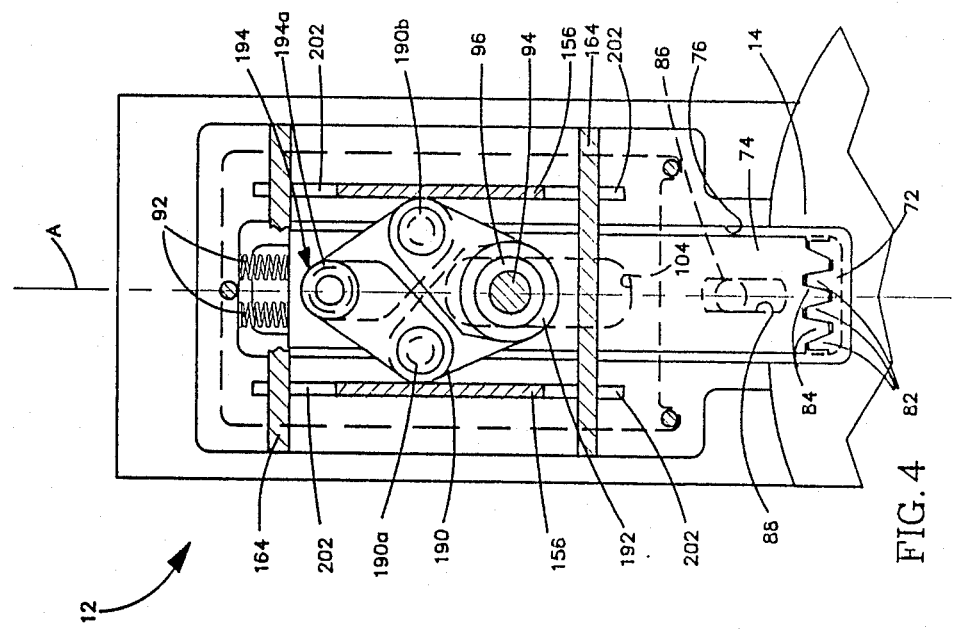
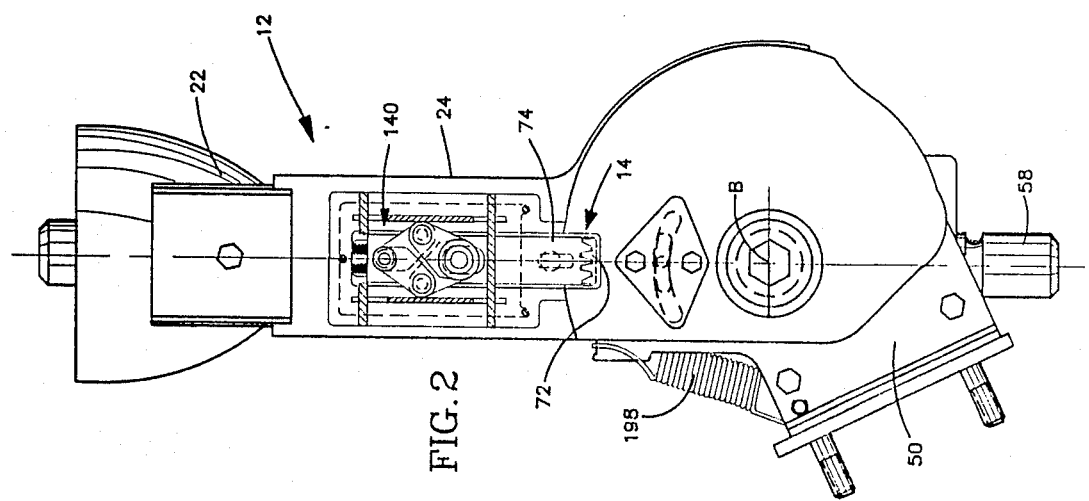

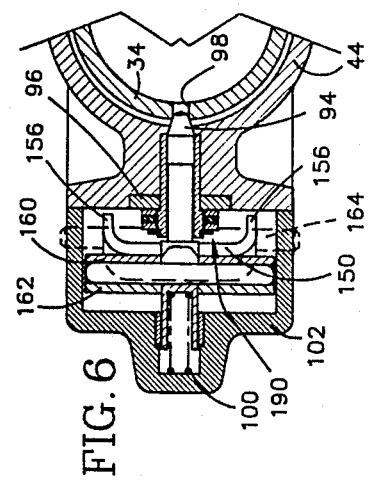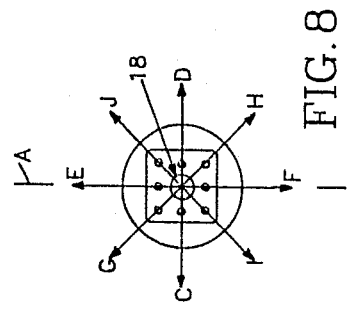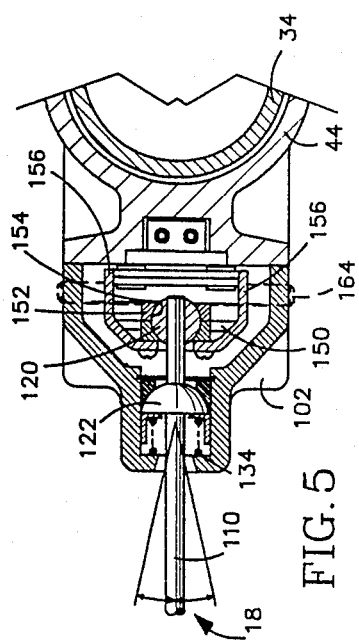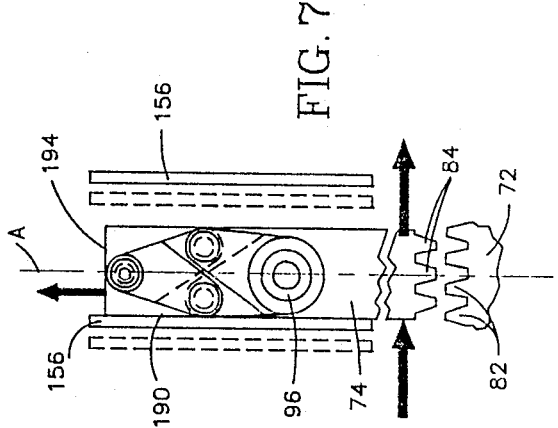

TILT-TELESCOPE STEERING COLUMN

BACKGROUND OF THE INVENTION

1. Field of the Invention

The present invention relates to a steering column for a vehicle, and particularly, relates to a steering column which is axially and angularly adjustable.

2. Description of the Prior Art

A vehicle steering column which is axially and angularly adjustable, i.e., a tilt-telescope steering column, is known. Typically, such a steering column includes a pair of steering column members which telescope relatively along a longitudinal central axis to effect the axial adjustment. The steering column members also pivot about a tilt axis, which is transverse to the longitudinal central axis, to effect the angular adjustment. The steering column includes a pair of locking mechanisms for respectively locking the steering column members in one of a plurality of telescoped positions and in one of a plurality of tilt positions. A single control lever pivotally mounted on the steering column is moved to release one or both of the locking mechanisms permitting the steering column members to be tilted and telescoped.

For example, such tilt-telescope steering columns are disclosed in U.S. Pat. No. 3,386,309 and in co-pending application entitled "Tilt-Telescope Steering Column" U.S. Ser. No. 813,715, filed Dec. 27, 1985 and assigned to the assignee of the present invention.

SUMMARY OF THE INVENTION

The present invention is directed to a steering column having a pair of steering column members arranged coaxially along a central axis. One member, which is connected to the steering wheel, is supported for telescoping movement along the central axis relative to the other member. The members are also supported for tilting movement about a tilt axis extending transverse to the central axis. A telescope lock mechanism releasably locks the members in one of a plurality of telescoped positions along the central axis. A tilt lock mechanism releasably locks the members in one of a plurality of tilt positions about the tilt axis. A control lever is mounted for pivotal movement toward and away from a neutral position. An actuating mechanism is operable in response to movement of the control lever away from the neutral position in a direction which is in the direction of desired movement of the steering wheel. The actuating mechanism releases the proper one or both of the tilt and telescope lock mechanisms to permit the steering wheel to move in the direction in which the control lever is moved.

The actuating mechanism includes a first actuator operable in response to pivotal movement of the control lever away from the neutral position in either direction in a first plane extending through the central axis to release the telescope lock mechanism permitting the members to move axially relative to each other. The actuating mechanism includes a second actuator operable in response to movement of the control lever away from the neutral position in either direction in a second plane extending perpendicular to the central axis to release the tilt lock mechanism permitting the members to move angularly. Furthermore, the first actuator and second actuator are operable together in response to movement of the control lever away from the neutral position in a direction diagonally between the first and second planes to release both the telescope and tilt lock mechanisms permitting simultaneous telescoping and tilting.

BRIEF DESCRIPTION OF THE DRAWINGS

Further features and advantages of the present invention will become apparent to those skilled in the art to which the present invention relates from reading the following specification with reference to the accompanying drawings, in which:

FIG. 2 is a side elevational view of the steering column of FIG. 1, taken approximately along the line 2—2 of FIG. 1;

FIG. 4 is an enlarged elevational view taken approximately along the line 4—4 of FIG. 3;

FIG. 5 is a sectional view taken approximately along the line 5—5 of FIG. 3;

FIG. 6 is a sectional view taken approxiamtely along the line 6—6 of FIG. 3;

FIG. 7 is an elevational view of a portion of the tilt lock mechanism of FIG. 4 with the parts illustrated in another position; and FIG. 8 is a schematic view of a control lever, taken approximately along the line 8—8 of FIG. 3, illustrating its possible paths of movement.

DESCRIPTION OF A PREFERRED EMBODIMENT

Figure 1:
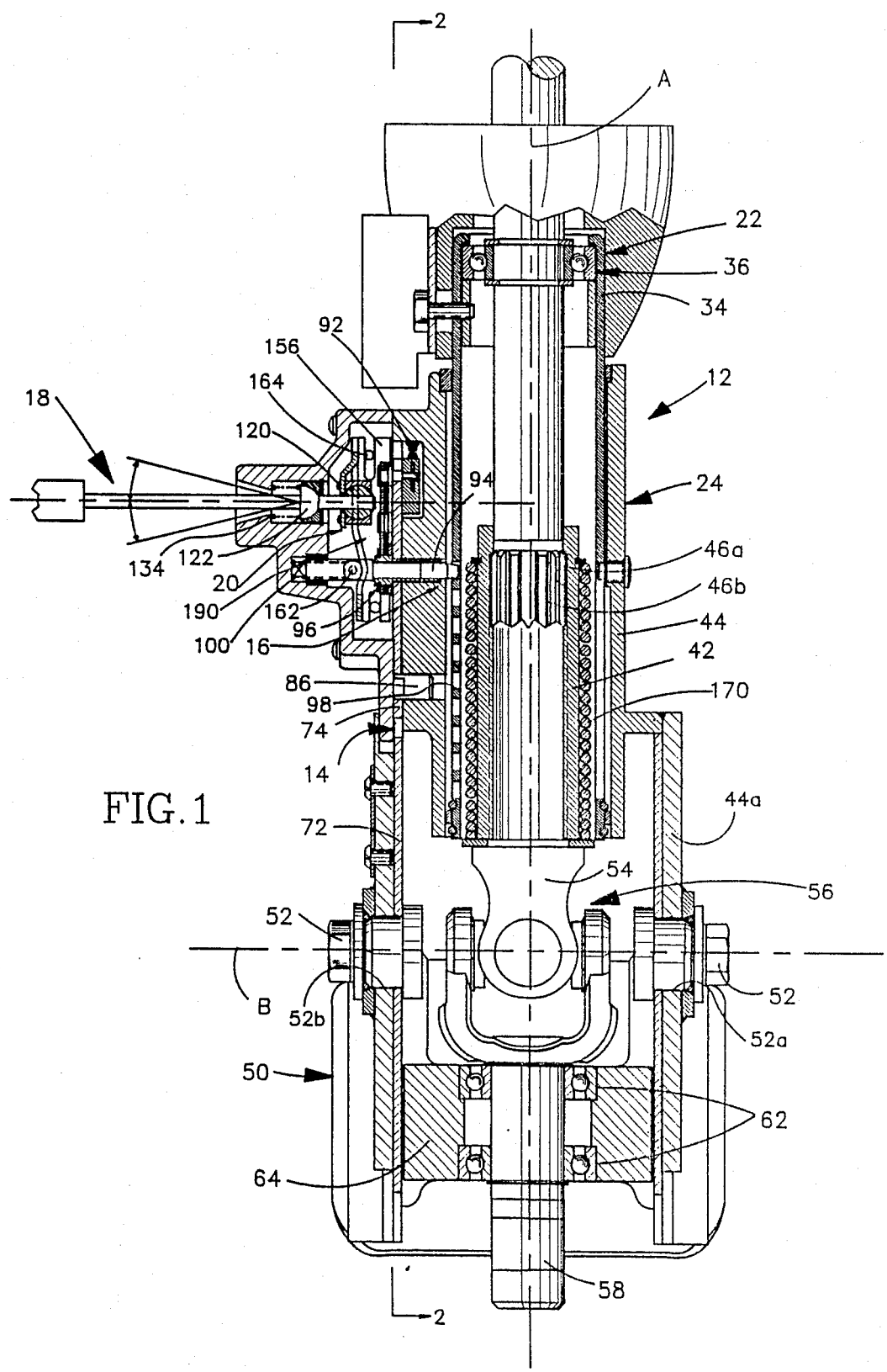
FIG. 1 is a sectional view of a steering column embodying the present invention.

A tilt-telescope steering column 12 embodying the present invention is shown in FIG. 1. The steering column 12 is angularly adjustable (tilts) and axially adjustable (telescopes). The steering column 12 includes a tilt locking mechanism 14, a telescope locking mechanism 16, a control lever 18 and an actuator mechanism 20. The actuator mechanism 20 is operable to release one or both of the tilt locking mechanism 14 and telescope locking mechanism 16 in response to movement of the control lever 18 away from a neutral or initial position.

The steering column 12 includes a pair of steering column members 22, 24. The upper steering column member 22 axially moves or telescopes relative to the lower or outer steering column member 24 to effect axial adjustment of the steering column 12 along the longitudinal central axis A of the steering column members. The steering column members 22, 24 move angularly or tilt about a tilt axis B to effect angular adjustment of the steering column 12. The axis B is perpendicular to the axis A.

The steering column member 22 includes an upper shaft 32 and an upper tubular member 34. The upper tubular member 34 of the column member 22 houses a bearing 36 which supports the upper shaft 32 for rotation about the axis A. The vehicle steering wheel (not shown) is connected to the upper shaft member 32, as is known, and is thus connected to the upper steering column member 22. The upper shaft member 32 rotates about the axis A upon rotation of the vehicle steering wheel.

The steering column member 24 includes a lower shaft 42 and a lower tubular member 44. The lower shaft 42 receives a portion of the upper shaft 32. The lower shaft 42 has internal splines 46a which mesh with external splines 46b on the upper shaft 32. Thus, rotational force between the shafts 32, 42 is transmitted through the splines 46a, 46b.

The lower tubular member 44 comprises a lower tubular portion 44a which is supported for pivotal movement relative to a mounting 50 by fasteners 50 that extend through opposite holes 52a and 52b of the wall of the tubular portion 44a. The mounting 50 attaches the steering column 12 to the vehicle. The lower tubular member 44 axially receives a portion of the upper tubular member 34. The upper tubular member 34 is axially movable relative to the lower tubular member 44 along the axis A. The tubular members 34, 44, and thus the steering column members 22, 24, are coaxially arranged for relative telescoping movement and are supported by the mounting 50 for tilting movement about the axis B.

The lower shaft 42 is connected to a yoke 54 of a universal joint 56. The universal joint 56 is also connected to an output shaft 58 attached to the steering gear (not shown) of the vehicle. The output shaft 58 is journalled in bearings 62 supported by plates 64 connected with the mounting 50. The universal joint 56 has a pivot axis about which the lower shaft 42 may pivot which is coaxial with the tilt axis B. Thus, upon rotation of the steering wheel, steering force is transmitted through the shafts 32, 42 to the output shaft 58 to effect vehicle steering.

The tilt locking mechanism 14 (FIGS. 2 and 3) releasably locks the steering column members 22, 24 in one of a plurality of tilt positions about the axis B relative to a mounting 50. The tilt lock mechanism 14 (FIG. 4) includes a fixed plate 72 and a movable plate 74. The fixed plate 72 is attached to the mounting 50 by bolts or other suitable means (not shown). The fixed plate 72 has a plurality of teeth 82 formed along its outer periphery.

The movable plate 74 is elongated and slidable within an elongated slot 76 extending in a direction parallel to the longitudinal axis A in the lower tubular member 44. The movable plate 74 also has a plurality of teeth 84 extending axially from an end which teeth 84 mesh with the teeth 82 of the fixed plate 72 to lock the fixed plate and movable plate together. A pin 86 is fixed to the lower tubular member 44 and is snugly received in a slot 88 in the movable plate 74 to guide axial movement of the plate between opposite lock and release positions toward and away from the fixed plate 72. A pair of springs 92 are disposed at an end of the movable plate 74 axially opposite from the teeth 84. The springs 92 bias the movable plate 74 toward the fixed plate 72 to cause meshing of the teeth 82, 84 to normally lock the plates together and maintain the steering column members in a tilt position.

The telescope locking mechanism 16 releasably locks the steering column members 22, 24 in one of a plurality of relative axial or telescoped positions along the axis A. The telescope lock mechanism 16 (FIG. 3) includes a locking pin 94 received in a bearing 96 mounted in the lower tubular member 44 and a plurality of axially spaced openings 98 in a portion of the upper tubular member 42. A housing 102 is connected to the lower tubular member 44. A spring 100 acts between the housing 102 and the end of the locking pin 94 to bias the locking pin into one of the openings 98. When the locking pin 94 is in any one of the openings 98, the steering column member 22 is prevented from telescoping relative to the steering column member 24. When the locking pin 94 is withdrawn from the openings 98, the steering column members 22, 24 are released and may telescope relative to one another to axially adjust the steering column 12. A slot 104 is in the movable plate 74 to permit the locking pin 94 to pass through. The slot 104 is sized such that the locking pin 94 does not interfere with the sliding movement of the movable plate 74, nor does sliding movement of the movable plate interfere with movement of the locking pin 94.

The control lever 18 includes an elongated shaft 110 having a handle grip 112 attached to an axial end portion of the shaft. A spherical bearing 120 is mounted to the other axial end portion of the shaft 110. A hemispherical member 122 is spaced a short distance from the bearing 120 along the shaft 110. A bearing 132 having a recess shaped similar to the hemispherical member 122 is mounted in the housing 102. The bearing 132 receives the hemispherical member 122 to support the control lever 18 for pivotal movement relative to the housing 102. A compression spring 134 is disposed between the housing 102 and a planar surface portion 136 of the hemispherical member 122. The spring 134 applies a biasing force urging the control lever 18 to a neutral position, as illustrated in FIGS. 1 and 3.

Figure 3:
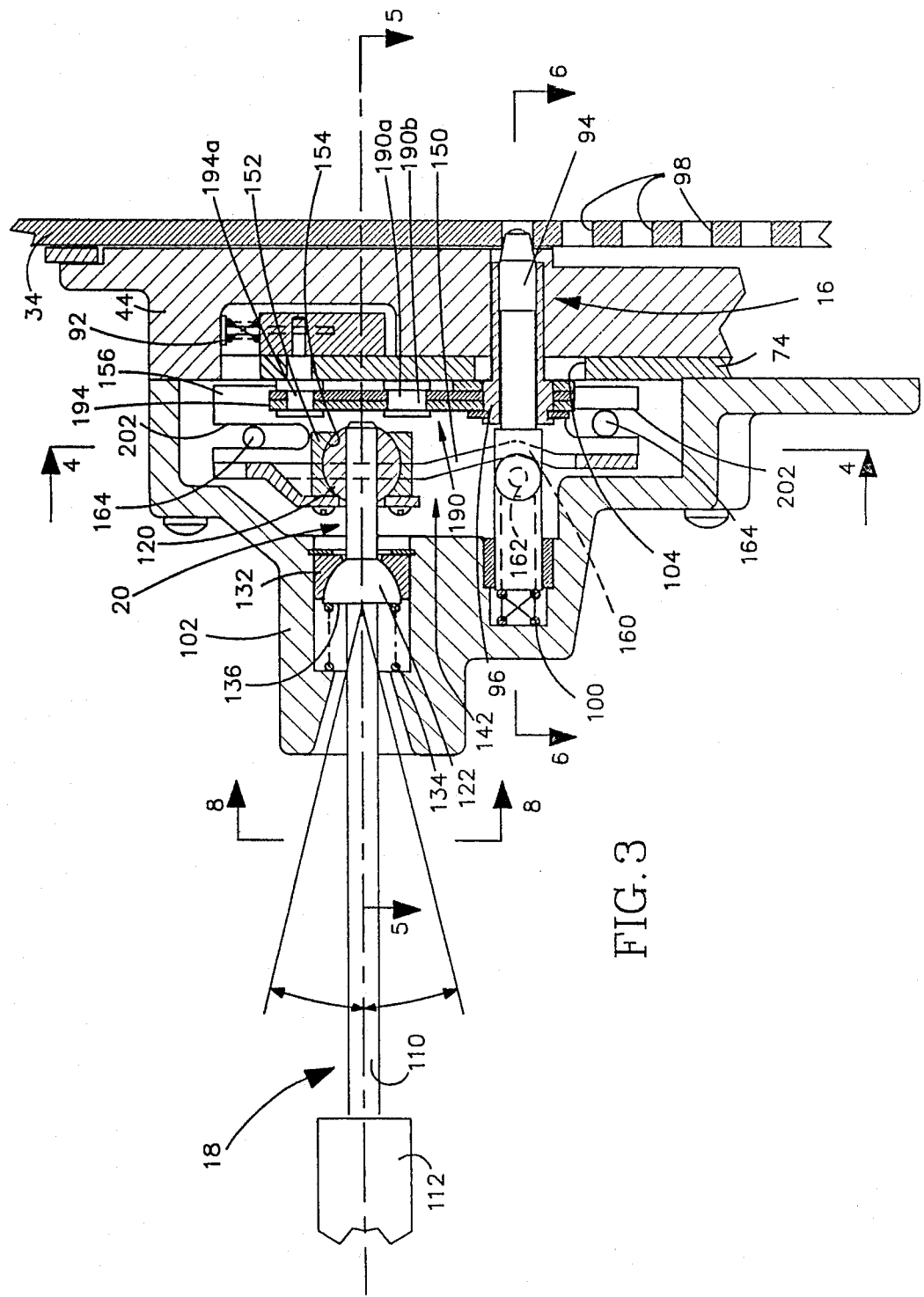
FIG. 3 is an enlarged sectional view of a portion of the steering column of FIG. 1.

The actuating mechanism 20 includes a tilt actuator 140 (FIG. 4) and a telescope actuator 142 (FIG. 3). The tilt actuator 140 is operable in response to movement of the control lever 18 away from the neutral position to release the tilt lock mechanism 14. The control lever 18 is movable in either direction in a plane extending transverse to the axis A, such as in the directions C-D, as illustrated in FIG. 8, to release the steering column members 22, 24 from being locked in one of the tilt positions. The telescope actuator 142 is operable in response to movement of the control lever 18 away from the neutral position to release the telescope lock mechanism 16. The control lever 18 is movable in either direction in a plane extending along the longitudinal axis A, such as in the directions E-F, to release the steering column members 22, 24 from being locked in a telescoped position. Both the tilt actuator 140 and telescope actuator 142 are operable together upon movement of the control lever 18 away from the neutral position to simultaneously release both the tilt and telescope locking mechanisms 14, 16. The control lever 18 is movable from the neutral position diagonally between the plane extending through axis A and the plane extending transverse to the axis A, such as in the directions G-H and I-J to release the steering column members 22, 24 to simultaneously tilt and telescope. Thus, when the control lever 18 is moved from the neutral position, the steering wheel and upper steering column member 22 may move in the same direction as control lever movement.

The telescope actuator 142 is preferably a metal plate member 150 (FIGS. 3 and 5) A central bearing 152 is connected to the plate member 150. The bearing 152 has a surface defining a spherical cavity 154. The bearing 152 retains the spherical bearing 120 in the spherical cavity 154 for moving the plate member 150 in response to pivotal movement of the control lever 18 about the hemispherical member 122. A pair of spaced apart flanges 156 extend in the same direction from opposite lateral sides of the plate member 150. A cam portion 160 (FIG. 3) in the form of an arcuate depression in the plate member 150 extends between the flanges 156 and is spaced from the bearing 152.

A roller 162 (FIGS. 3 and 6) connected to the locking pin 94 of the telescope locking mechanism 16 is normally engaged with and seated in the cam portion 160 of the plate member 150. The forward or tapered end portion of the locking pin 94 extends into one of the openings 98 to lock the steering column members 22, 24 in a given telescoped position. The plate member 150 is slidable on a pair of spaced apart bars 164 extending transversely across the housing 102. The bars 164 extend through slots 202 in the flanges 156. The plate member 150 is movable parallel to the axis A, transverse to the axis A, and diagonally therebetween corresponding to the directions C through J of the control lever 18, as seen in FIG. 8. The plate member 150 actually moves in a direction opposite to the direction of movement of the control lever 18 because the control lever pivots about the hemispherical beating 122 intermediate the plate member and handle grip 112 which the operator moves.

When the plate member 150 is moved in a direction parallel to the axis A or diagonally thereto, the roller 162 rides along a side surface of the cam portion 160. The locking pin 94 is forced out of the opening 98 by the roller 162 to release the telescope locking mechanism 16 and permit telescoping of the steering column 12. The steering column member 22 is lightly biased by the spring 170 towards the extended position relative to the steering column member 24. Thus, when the telescope locking mechanism 16 is released, the steering column 12 will tend to extend due to the bias force. The bias force can easily be overcome by the vehicle operator moving the control lever in the direction F (FIG. 8) to contract the steering column 12. When the plate member 150 moves transversely to the axis A, the roller 162 merely slides along the depression of the cam portion 160 without pulling the locking pin 94 to actuate the telescope lock mechanism 16.

The tilt actuator 140 (FIG. 4) includes a contractable and extendable scissor linkage mechanism 190 disposed between and engageable with the flanges 156 of the plate member 150. A scissor linkage mechanism 190 is pivotally supported at one end 192 about the bearing 96 connected to the lower tubular member 44. The scissor linkage mechanism 190 is also pivotally connected at an opposite end portion 194 to the movable plate 74 of the tilt locking mechanism 14 by a pin 194a. The scissor mechanism 190 is also pivotable about pins 190a and 190b.

When the plate member 150 of the telescope actuator 142 is moved transversely to the axis A from the neutral position illustrated in FIG. 4, one of the flanges 156 engages a respective side of the scissor linkage mechanism 190. The flange 156 forces the scissor linkage mechanism 190 to move from the longitudinally contracted position to the longitudinally extended position illustrated in FIG. 7. The scissor linkage mechanism 190 laterally contracts as it longitudinally extends. The end portion 194 of the scissor linkage mechanism 190 moves in a direction parallel to the axis A as the scissor linkage mechanism extends to move the movable plate 74 away from the fixed plate 72. Thus, the tilt locking mechanism 14 is actuated by moving the teeth 84 of the movable plate 74 out of engagement with the teeth 82 on the fixed plate 72 to release the steering column 12 to tilt. The steering column 12 is lightly biased by the spring 198 to pivot counterclockwise about the tilt axis B, as viewed in FIG. 2, when the tilt lock mechanism 14 is actuated. However, the bias can be easily overcome by the vehicle operator moving the control lever 18 in the direction D (FIG. 8) to pivot the steering column 12 clockwise about the axis B.

When the plate member 150 is moved in a direction diagonal to the axis A, such as in the directions G, H, I or J (FIG. 8), the roller 162 is forced along a side surface of the cam portion 160 and simultaneously one of the flanges 156 engages the scissor linkage mechanism 190. The locking pin 94 is pulled from one of the openings 98 by the roller 162. The movable plate 74 is pulled out of locking engagement with the fixed plate 72 by the scissor linkage mechanism 190. Thus, the tilt locking mechanism 14 and the telescope locking mechanism 16 are released simultaneously to permit both tilting and telescoping of the steering column 12.

The resistive force of the springs 92, 100 of the telescope and tilt lock mechanism 16, 14 will transmit a "feedback" signal through the control lever 18 to the vehicle operator. For example, moving the control lever 18 in the direction D (FIG. 8) will tilt the steering column 12 only clockwise, as viewed in FIG. 2, about the axis B and the control lever will transmit a resistive force to the operator due to the bias of the springs 92. Moving the control lever 18 in direction J will tilt the steering column 12 clockwise and extend it, but will transmit a resistive force approximately twice that of movement of the control lever for just tilting or telescoping. Thus, the steering column 12 will have a natural tendency to keep the control lever 18 in a mode that releases only one of the two lock mechanisms 14, 16 at a time. If an operator wants to release both at one time, he can do so but the control lever 18 will have a relatively larger resistive force. Although the control lever 18 is movable in any direction from its neutral position, as seen in FIG. 8, if so desired it can be restricted by mechanically blocking movement in the directions G, H, I, and J so the operator can only release one of the locking mechanisms 14, 16 at a time.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, I claim:

1. A vehicle steering column apparatus comprising:
a pair of steering column members arranged coaxially about a first axis, one of said members being movable axially along the first axis relative to the other of said members;
means for supporting said members for angular movement about a second axis extending transverse to the first axis;
first locking means for releasably locking said members in one of a plurality of relative axial positions along the first axis;
second locking means for releasably locking said members in one of a plurality of angular positions about the second axis;
a control lever mounted for pivotal movement toward and away from a neutral position; and
actuating means operable in response to pivotal movement of said control lever away from said neutral position in a direction of desired movement of said one member for actuating one or both of said first and second locking means to release said one member for movement in the same direction as the direction in which said control lever is moved.

2. The apparatus set forth in claim 1 wherein said actuating means includes telescope actuating means operable in response to pivotal movement of said control lever away from said neutral position in either direction in a plane containing the first axis for releasing said first locking means to permit said one member to move along the first axis relative to the other of said members.

3. The apparatus set forth in claim 1 wherein said actuating means includes tilt actuating means operable in response to pivotal movement of said control lever away from said neutral position in a plane extending transverse to the first axis for releasing said second locking means to permit said members to move angularly about the second axis.

4. The apparatus set forth in claim 1 wherein said actuating means includes telescope actuating means and tilt actuating means operable in response to pivotal movement of said lever away from said neutral position in a direction diagonally between a plane containing the first axis and a plane extending transverse to the first axis to release both said first and second locking means to permit said one member to move along the first axis relative to the other of said members and said members to move angularly about the second axis.

5. The apparatus set forth in claim 1 wherein said second locking means includes:
a pair of tilt locking members which have interengageable portions to lock said pair of tilt locking members together, one of said pair of tilt locking members being movable relative to the other one of said pair of tilt locking members;
means for mounting one of said pair of tilt locking members for tilting movement about the second axis with said steering column members;
means for fixing the other of said tilt locking members from tilting movement relative to said steering column members; and
spring means biasing said movable one of said pair of tilt locking member relative to the other tilt locking member to cause said portions to interengage to lock said pair of tilt locking members together.

6. The apparatus set forth in claim 1 wherein said first locking means includes:
a locking member;
a first one of said steering column members having a plurality of openings each of which may receive a portion of said locking member;
means for supporting said locking member for axial movement within a second one of said steering column members; and
biasing means for applying a biasing force to said locking member urging a portion of said locking member into one of said openings.

7. The apparatus set forth in claim 1 wherein said control lever includes:
an elongated shaft;
a spherical bearing disposed adjacent an end portion of said shaft and connected to said actuating means for pivotal movement relative thereto;
a hemispherical member disposed on said shaft axially spaced from said spherical bearing for mounting said shaft to one of the steering column members for pivotal movement relative thereto; and
biasing means engaged with a planar surface portion of said hemispherical member for applying a biasing force to urge said shaft to said neutral position.

8. The apparatus set forth in claim 7 wherein said actuating means includes telescope actuating means having a plate member pivotally connected to said spherical bearing, a pair of spaced apart flange portions extending in the same direction from said plate member, and a cam portion extending between said flange portions for engaging said first locking means, said plate member being slidable along said first axis upon pivotal movement of said control lever shaft for said cam portion to actuate said first locking means.

9. The apparatus set forth in claim 8 wherein said actuating means further includes tilt actuating means including a contractable and extendable scissor linkage mechanism disposed between and engageable with said flange portions of said plate member, said scissor linkage mechanism being pivotally supported by one of the steering column members and pivotally connected at an opposite end to said second locking means, said scissor linkage mechanism being extendable to actuate said second locking means upon engagement with one of said flange portions of said plate member in response to pivotal movement of said control lever shaft in a direction transverse to said longitudinal axis.

10. A vehicle steering column apparatus comprising:
a pair of steering column members arranged coaxially with one another about a central axis, a first one of said members being movable along the central axis relative to a second one of said members;
means for supporting said first and second members for angular movement about a second axis extending transverse to the central axis;
a housing connected to said second member;
first locking means mounted to said housing and engageable with said first member for releasably locking said members in one of a plurality of relative telescope positions axially along said central axis;
second locking means mounted to said housing and operable for releasably locking said members in one of a plurality of angular positions about said second axis;
a control lever mounted to said housing for pivotal movement toward and away from a neutral position;
telescope actuating means mounted to said housing and operable in response to pivotal movement of said control lever away from said neutral position in either direction in a first plane extending parallel to the central axis to actuate said first locking means to release said members from being locked in one of the telescope positions; and
tilt actuating means mounted to said housing and operable in response to pivotal movement of said control lever away from said neutral position in either direction in a second plane extending transverse to the central axis to actuate said tilt lock mechanism to release said members from being locked in one of the angular positions; and
said telescope actuating means and said tilt actuating means being operable together in response to pivotal movement of said control lever away from said neutral position diagonally between the first and second planes to actuate both said first and second locking means to release said members from being locked in one of said telescope and tilt positions such that movement of said control lever in the direction of desired movement of the steering column causes the proper one or both of said telescope and tilt actuating means to actuate the proper ones of said first and second locking means to release said members from being locked in one of the telescope positions and from being locked in one of the angular positions for movement to a desired position in the direction that said control lever is moved.

11. The apparatus set forth in claim 10 wherein said control lever includes:
an elongated shaft;
a spherical bearing disposed on an end portion of said shaft and connected to said telescope actuating means for pivotal movement relative thereto;
a hemispherical member disposed on said shaft and axially spaced from said spherical bearing and being supported by said housing for pivotal movement relative thereto; and
biasing means engaged with said housing and a planar surface portion of said hemispherical member for applying a biasing force to urge said shaft to said neutral position.

12. The apparatus set forth in claim 11 wherein said telescope actuating means includes a plate member slidably mounted in said housing and pivotally connected to said spherical bearing, a pair of spaced apart flange portions extending from said plate member, and an arcuate cam portion extending between said flange portions for engaging said first locking means, said plate member being slidable in a direction parallel to said central axis in response to pivotal movement of said control lever shaft for said arcuate cam portion to actuate said first locking means.

13. The apparatus set forth in claim 12 wherein said tilt actuating means includes a contractable and extendable scissor linkage mechanism disposed between and engageable with said flange portions of said plate member, said scissor linkage mechanism being pivotally mounted at one end to said housing and pivotally connected at another end to said second locking means, said scissor linkage mechanism being extendable to actuate said second locking means upon engagement at with one of said flange portions of said plate member in response to pivotal movement of said control lever shaft in a direction transverse to the central axis.

14. A vehicle steering column apparatus comprising:
a pair of steering column members arranged coaxially about a first axis, one of said members being connectable with a steering wheel and being movable axially along the first axis relative to the other of said members;
means for supporting said members for angular movement about a second axis extending transverse to the first axis;
first locking means for releasably locking said members in one of a plurality of relative axial positions along the first axis;
second locking means for releasably locking said members in one of a plurality of angular positions about the second axis;
a control lever mounted for pivotal movement toward and away from a neutral position; and
actuating means operable in response to pivotal movement of said control lever away from said neutral position in a direction of desired movement of said steering wheel for actuating one or both of said first and second locking means to release said steering wheel for movement in the same direction as the direction in which said control lever is moved.

15. The apparatus set forth in claim 14 wherein said actuating means includes telescope actuating means operable in response to pivotal movement of said control lever away from said neutral position in either direction in a plane containing the first axis for releasing said first locking means to permit said steering wheel to move along the first axis.

16. The apparatus set forth in claim 14 wherein said actuating means includes tilt actuating means operable in response to pivotal movement of said control lever away from said neutral position in a plane extending transverse to the first axis for releasing said second locking means to permit said steering wheel to move angularly about the second axis.

17. The apparatus set forth in claim 15 wherein said actuating means includes telescope actuating means and tilt actuating means operable in response to pivotal movement of said lever away from said neutral position in a direction diagonally between a plane containing the first axis and a plane extending transverse to the first axis to release both said first and second locking means to permit said steering wheel to move along the first axis and to move angularly about the second axis.

* * * * *